(12) United States Patent
Kim

(10) Patent No.: US 12,372,362 B2
(45) Date of Patent: Jul. 29, 2025

(54) METHOD AND APPARATUS FOR GENERATING TRAVEL ROUTE

(71) Applicant: 42DOT INC., Seoul (KR)

(72) Inventor: Ji Seong Kim, Yongin (KR)

(73) Assignee: 42DOT, INC., Seoul (KR)

( * ) Notice: Subject to any disclaimer, the term of this patent is extended or adjusted under 35 U.S.C. 154(b) by 156 days.

(21) Appl. No.: 18/256,218

(22) PCT Filed: Dec. 8, 2021

(86) PCT No.: PCT/KR2021/018498
§ 371 (c)(1),
(2) Date: Jun. 7, 2023

(87) PCT Pub. No.: WO2022/124779
PCT Pub. Date: Jun. 16, 2022

(65) Prior Publication Data
US 2024/0019255 A1    Jan. 18, 2024

(30) Foreign Application Priority Data

Dec. 11, 2020 (KR) .................... 10-2020-0172932

(51) Int. Cl.
G01C 21/34 (2006.01)
(52) U.S. Cl.
CPC ..... *G01C 21/3446* (2013.01); *G01C 21/3453* (2013.01)
(58) Field of Classification Search
CPC ............ G01C 21/3446; G01C 21/3453; G01C 21/3438; G01C 21/3469; G06Q 50/40;
(Continued)

(56) References Cited

U.S. PATENT DOCUMENTS

2008/0195428 A1* 8/2008 O'Sullivan ............ G06Q 10/02
705/6
2014/0088870 A1* 3/2014 Varoglu ............. G01C 21/3614
701/533
(Continued)

FOREIGN PATENT DOCUMENTS

JP       2003006784 A    1/2003
JP       2004-245630 A   9/2004
(Continued)

OTHER PUBLICATIONS

Internation Search Report Dated Mar. 23, 2022.
(Continued)

*Primary Examiner* — Ryan Rink
(74) *Attorney, Agent, or Firm* — Harvest IP Law, LLP

(57) ABSTRACT

The present disclosure relates to a method and apparatus for generating a travel route. The method according to an embodiment of the present disclosure may include obtaining first information related to first group points, calculating first estimated required times for moving between the first group points, based on the first information, and recording the first estimated required times in a first area of a weight matrix. In addition, the method may further include obtaining second information related to a second group point, calculating, based on the first information and the second information, second estimated required times including estimated required times for moving from the first group points to the second group point, and estimated required times for moving from the second group point to the first group points, and recording the second estimated required times in a second area of the weight matrix.

In addition, the method may further include generating a travel route based on the first estimated required times and the second estimated required times.

9 Claims, 10 Drawing Sheets

(58) Field of Classification Search
CPC . G06Q 10/025; G06Q 10/047; G06Q 10/0631
See application file for complete search history.

(56) References Cited

U.S. PATENT DOCUMENTS

| | | | |
|---|---|---|---|
| 2015/0228192 A1* | 8/2015 | Kawamoto | G08G 1/202 |
| | | | 701/537 |
| 2020/0173790 A1* | 6/2020 | Kelleher | G01C 21/343 |
| 2020/0263999 A1* | 8/2020 | Stewart | G06F 16/29 |
| 2020/0378775 A1 | 12/2020 | Beaurepaire | |

FOREIGN PATENT DOCUMENTS

| | | |
|---|---|---|
| KR | 10-0517808 B1 | 9/2005 |
| KR | 10-2013-0111801 A | 10/2013 |
| KR | 10-1888807 B1 | 8/2018 |
| KR | 10-2019-0093318 A | 8/2019 |
| KR | 10-2035864 B1 | 10/2019 |
| KR | 10-2020-0116317 A | 10/2020 |
| WO | 2014045359 A1 | 3/2014 |

OTHER PUBLICATIONS

Office Action from Japanese Patent Office (rejection) dated 20024-05-14.
Office Action from Japanese Patent Office (allowance) dated 20024-12-03.

* cited by examiner

FIG. 3

|  | ARRIVAL | A | B | C | | |
|---|---|---|---|---|---|---|
| DEPARTURE | | | | | | |
| A | | 0 | 10 | 8 | | |
| B | | 7 | 0 | 23 | | |
| C | | 28 | 32 | 0 | | |
| | | | | | | |
| | | | | | | |

FIG. 4

|  | ARRIVAL | A | B | C | D |  |
|---|---|---|---|---|---|---|
| DEPARTURE | A | 0 | 10 | 8 | 3 | |
|  | B | 7 | 0 | 23 | 11 | |
|  | C | 28 | 32 | 0 | 12 | |
|  | D | 23 | 11 | 26 | 0 | |

FIG. 5

| DEPARTURE \ ARRIVAL | $A_s$ | $A_d$ | $B_s$ | $B_d$ | $C_s$ | $C_d$ |
|---|---|---|---|---|---|---|
| $A_s$ | 0 | 10 | 8 | 3 | 10 | 13 |
| $A_d$ | 7 | 0 | 23 | 11 | 32 | 26 |
| $B_s$ | 28 | 32 | 0 | 12 | 33 | 21 |
| $B_d$ | 23 | 11 | 26 | 0 | 45 | 38 |
| $C_s$ | 12 | 21 | 13 | 39 | 0 | 18 |
| $C_d$ | 9 | 29 | 19 | 34 | 20 | 0 |

FIG. 6

|  | ARRIVAL | A | B | C | D | |
|---|---|---|---|---|---|---|
| DEPARTURE | | | | | | |
| A | | 0 | 10 | ~~8~~ 9 | | |
| B | | 7 | 0 | 23 | | |
| C | | ~~28~~ 17 | 32 | 0 | | |
| D | | | | | | |

FIG. 7

|  | ARRIVAL A | B | C | D |
|---|---|---|---|---|
| DEPARTURE A | 0 | 10 | 8 | 3 |
| B | 7 | 0 | 23 | 11 |
| C | 28 | 32 | 0 | 12 |
| D | 23 | 11 | 26 | 0 |

METHOD AND APPARATUS FOR GENERATING TRAVEL ROUTE

CROSS REFERENCE TO RELATED APPLICATION

This application is a National Stage of International Application No. PCT/KR2021/018498 filed on Dec. 8, 2021, claiming priority based on Korean Patent Application No. 10-2020-0172932 filed on Dec. 11, 2020.

TECHNICAL FIELD

The present disclosure relates to a method and apparatus for generating a travel route.

BACKGROUND ART

In general, the demand-responsive transport (DRT) system is a next-generation urban transport system called small train, small autonomous tracked vehicle, unmanned tracked taxi, etc., and is a new transport system being developed to eliminate disadvantages such as air pollution and traffic congestion while retaining the convenience of automobiles.

The demand-responsive transport system is a concept of operating an unmanned autonomous vehicle on a network-shaped route, and the vehicle is capable of carrying 2 to 6 passengers, and when the destination is determined after the vehicle is dispatched at a request of passengers, the optimal route is selected from among several routes on a network and the vehicle operates on the optimal route without break.

However, in the demand-responsive transport system, as the number of points to be visited increases, the number of routes to be generated increases exponentially. For example, in order to visit 5 points, it is ideal to consider 5! (i.e., 120) possible routes and then generate an optimal route, whereas in order to visit 10 points, it is ideal to consider 10! possible routes and then generate an optimal route.

Accordingly, there is a need for research on a method of efficiently generating a route.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

DISCLOSURE

Technical Problem

The present disclosure provides a method and apparatus for generating a travel route. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure may be implemented by means provided in the claims and a combination thereof.

Technical Solution

As a technical means to solve the above-mentioned technical problem, a first aspect of the present disclosure may provide a method for generating a travel route including: obtaining first information related to first group points; calculating first estimated required times for moving between the first group points, based on the first information; recording the first estimated required times in a first area of a weight matrix; obtaining second information related to a second group point; calculating, based on the first information and the second information, second estimated required times including estimated required times for moving from the first group points to the second group point, and estimated required times for moving from the second group point to the first group points; recording the second estimated required times in a second area of the weight matrix; and generating a travel route based on the first estimated required times and the second estimated required times.

A second aspect of the present disclosure may provide a method including: receiving, from a first user, first itinerary information including a departure point and a destination; generating a travel route based on the first itinerary information; receiving second itinerary information from a second user; and updating the travel route based on the first itinerary information and the second itinerary information.

A third aspect of the present disclosure may provide an apparatus for generating a travel route including: a memory storing at least one program; and a processor configured to executing the at least one program to perform an operation, wherein the processor is further configured to: obtain first information related to first group points; calculate first estimated required times for moving between the first group points, based on the first information; record the first estimated required times in a first area of a weight matrix; obtain second information related to a second group point; calculate, based on the first information and the second information, second estimated required times including estimated required times for moving from the first group points to the second group point, and estimated required times for moving from the second group point to the first group points; record the second estimated required times in a second area of the weight matrix; and generate a travel route based on the first estimated required times and the second estimated required times.

A fourth aspect of the present disclosure may provide a computer-readable recording medium having recorded thereon program for causing a computer to execute the methods of the first aspect and the second aspect.

In addition, other methods and systems for implementing the present disclosure, and a computer-readable recording medium having recorded thereon a computer program for executing the methods may be further provided.

Other aspects, features, and advantages other than those described above will be apparent from the following drawings, claims, and detailed description.

Advantageous Effects

According to the above-described problem solving means of the present disclosure, in a case in which second estimated required times are calculated after first estimated required times are recorded in a first area of a weight matrix, the first estimated required times recorded in the first area of the weight matrix are maintained without being updated, by using a certain method, and the second estimated required times are recorded in a second area of the weight matrix by using a multi-point-to-point (M2P) route finding method and a point-to-multi-point (P2M) route finding method, such that the computing power and the required time for recording data in the weight matrix may be reduced.

DESCRIPTION OF DRAWINGS

FIG. 3 is a diagram for describing an example in which first estimated required times are recorded in a weight matrix, according to an embodiment.

FIG. 4 is a diagram for describing an example in which second estimated required times are recorded in a weight matrix, according to an embodiment.

FIG. 5 is a diagram for describing an example in which second estimated required times are recorded in a weight matrix, according to an embodiment.

FIG. 6 is a diagram for describing an example of updating a weight matrix, according to an embodiment.

FIG. 7 is a diagram for describing an example of updating a weight matrix, according to an embodiment.

BEST MODE

Figure 1:
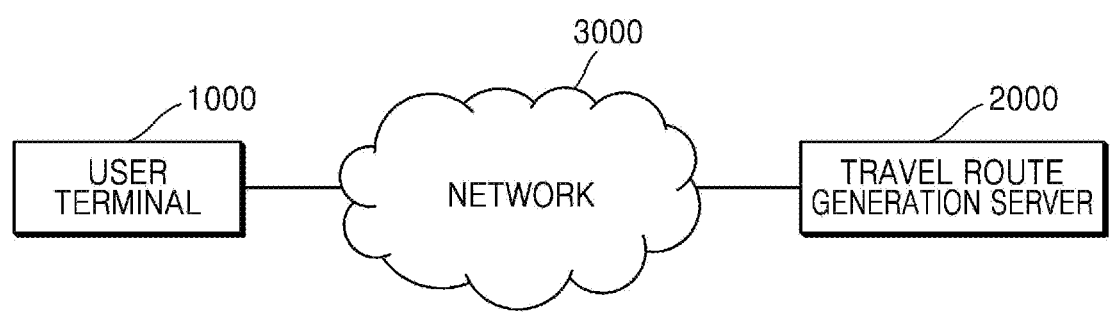
FIG. 1 is a diagram illustrating a system including a user terminal and a travel route generation server, according to an embodiment.

The present disclosure relates to a method and apparatus for generating a travel route. The method according to an embodiment of the present disclosure may include obtaining first information related to first group points, calculating first estimated required times for moving between the first group points, based on the first information, and recording the first estimated required times in a first area of a weight matrix.

In addition, the method may further include obtaining second information related to a second group point, calculating, based on the first information and the second information, second estimated required times including estimated required times for moving from the first group points to the second group point, and estimated required times for moving from the second group point to the first group points, and recording the second estimated required times in a second area of the weight matrix.

In addition, the method may further include generating a travel route based on the first estimated required times and the second estimated required times.

Mode for Invention

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression may include a plural expression unless they are definitely different in a context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Travel routes described below may be applied to various scenarios, such as bicycle sharing, car sharing, mobility-on-demand, demand-responsive transport, mobility service, mobility management, intermodal passenger transport, or delivery.

Hereinafter, the present disclosure will be described in detail with reference to the accompanying drawings.

FIG. 1 is a diagram illustrating a system including a user terminal and a travel route generation server, according to an embodiment.

The system according to an embodiment may include a user terminal 1000 and a travel route generation server 2000.

The user terminal 1000 may be a smart phone, a tablet personal computer (PC), a PC, a smart television (TV), a mobile phone, a personal digital assistant (PDA), a laptop computer, a media player, a microserver, a global positioning system (GPS) device, an electronic book terminal, and a digital broadcasting terminal, a navigation system, a kiosk, an MP3 player, a digital camera, a home appliance, a device equipped with a camera, or any one of other mobile or nonmobile computing devices. In addition, the user terminal 1000 may be a wearable device having a communication function and a data processing function, such as a watch, glasses, a hair band, or a ring. However, the present disclosure is not limited thereto.

The travel route generation server 2000 may be implemented as a computer device or a plurality of computer devices that provide a command, code, a file, content, a service, and the like by performing communication through a network.

The travel route generation server 2000 may calculate an estimated required time for moving between points based on information about a plurality of points. The travel route generation server 2000 may generate a travel route by determining an order of visits to the plurality of points, based on the estimated required time.

The user terminal 1000 and the travel route generation server 2000 may perform communication by using a network 3000. In an embodiment, an application may be installed in the user terminal 1000, and the travel route generation server 2000 may be a server that manages the application. The travel route generation server 2000 may exchange data with the user terminal 1000 through the application installed in the user terminal 1000.

The network 3000 may include a local area network (LAN), a wide area network (WAN), a value-added network (VAN), a mobile radio communication network, a satellite communication network, and a combination thereof, may be a comprehensive data communication network that allows each network constituent entity illustrated in FIG. 1 to perform seamless communication with each other, and may include a wired Internet network, a wireless Internet network, and a mobile wireless communication network. In addition, the wireless communication may include, but is not limited to, a wireless LAN (e.g., Wi-Fi), Bluetooth, Bluetooth Low Energy, Zigbee, Wi-Fi Direct (WFD), ultra-wideband (UWB), Infrared Data Association (IrDA), and near-field communication (NFC).

Meanwhile, although FIG. 1 illustrates that the travel route generation server 2000 performs communication with one user terminal 1000 by using the network, this is only an example, and the travel route generation server 2000 may perform communication with two or more user terminals 1000 by using the network.

Figure 2A:
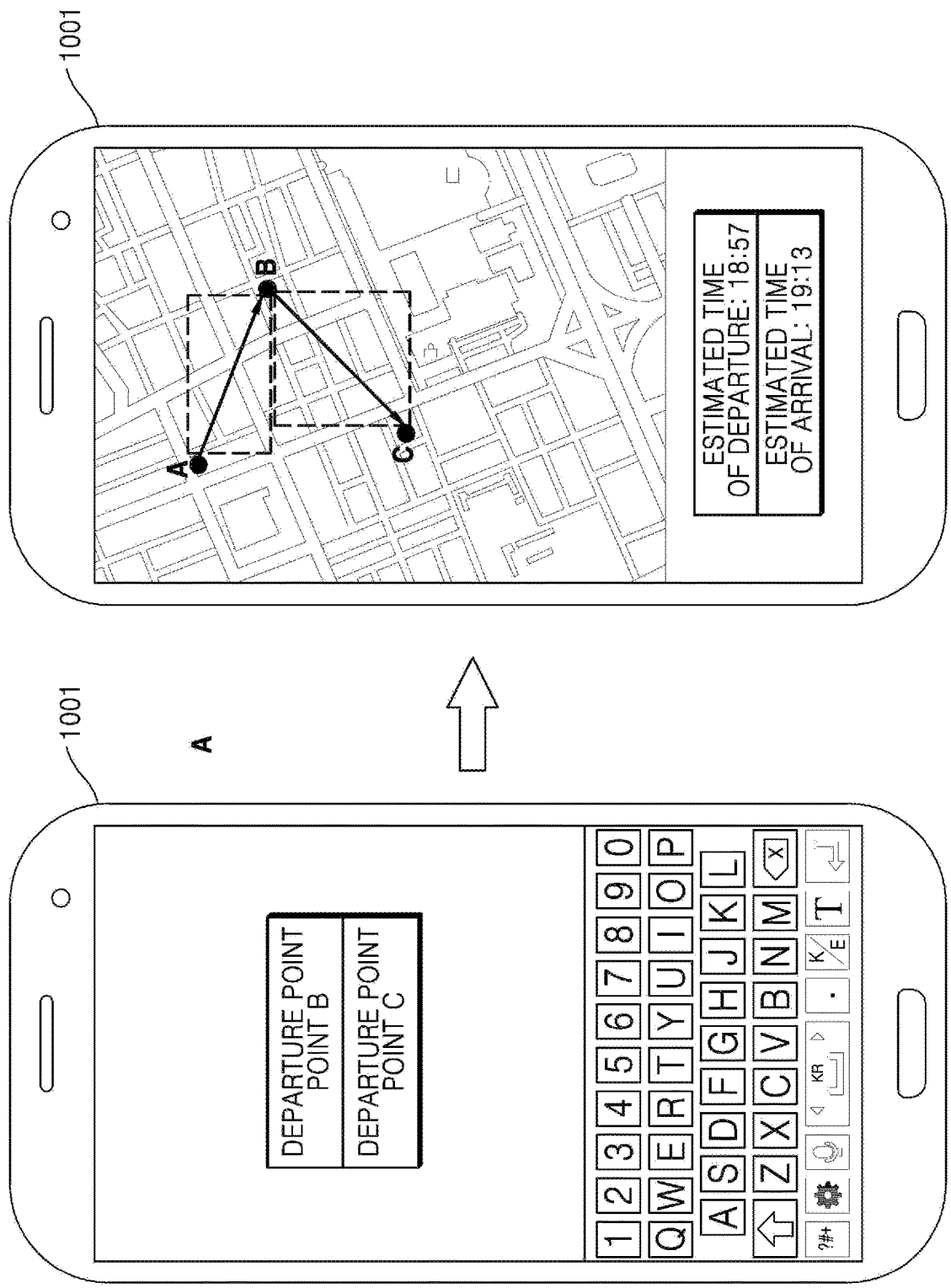
FIGS. 2A to 2B are diagrams for describing examples in which a travel route providing server provides a travel route to a user terminal, according to an embodiment.
Figure 2B:
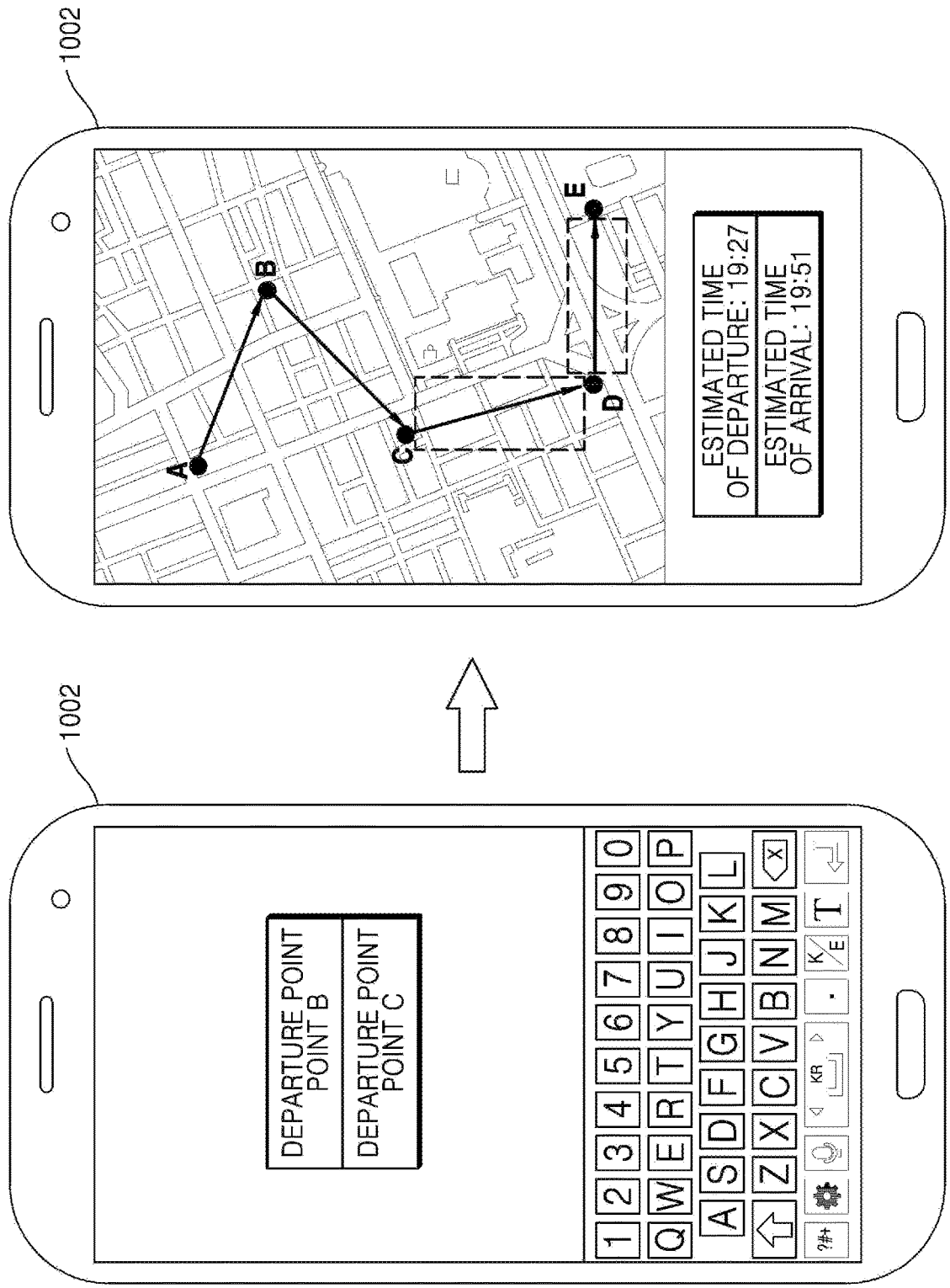

FIGS. 2A to 2B are diagrams for describing examples in which a travel route providing server provides a travel route to a user terminal, according to an embodiment.

In FIGS. 2A and 2B, a first user terminal 1001 and a second user terminal 1002 are the same as the user terminal 1000 of FIG. 1, and thus detailed descriptions thereof will be omitted.

Referring to FIG. 2A, the first user terminal 1001 may receive, from a first user, an input of a departure point and a destination. For example, the first user may input 'Point B' as the departure point and 'Point C' as the destination, through an input interface of the first user terminal 1001.

The first user terminal 1001 may transmit first itinerary information including the departure point and the destination, to the travel route generation server 2000. The itinerary information may include, but is not limited to, an input time point at which the user inputs the departure point and the destination, the name of the departure point, the latitude and longitude of the departure point, the name of the destination, the latitude and longitude of the destination, and the like.

The travel route generation server 2000 may generate a travel route based on the first itinerary information received from the first user terminal 1001. The travel route may be a route indicated on a map, along which a means of transportation (e.g., a bicycle, a kick scooter, a car, etc.) is to travel.

For example, the travel route generation server 2000 may generate a travel route for moving from 'Point A' corresponding to the initial point to 'Point B', which is the departure point of the first user, and a travel route for moving from 'Point B' to 'Point C', which is the destination of the first user. Here, the initial point may be a point corresponding to the location of the means of transportation at the time point at which the first user terminal 1001 receives the input of the departure point and the destination. Alternatively, the initial point may be a point corresponding to the location of the means of transportation at the time point at which the travel route generation server 2000 receives the first itinerary information from the first user terminal 1001.

Although FIG. 2A illustrates that the travel route from 'Point A' to 'Point B' and the travel route from 'Point B' to 'Point C' are straight lines, this is for convenience of description, and the travel routes between the respective points may be generated to include travelable sections on an actual map.

The travel route generation server 2000 may calculate an estimated time of departure and an estimated time of arrival based on the generated travel routes. The travel route generation server 2000 may calculate the estimated time of departure and the estimated time of arrival by using the length of the generated travel routes, traffic conditions (e.g., traffic congestion), selection options (e.g., shortest distance, shortest required time, etc.), and the like. The estimated time of departure may refer to a time point at which the means of transportation is expected to arrive at 'Point B' after departing from 'Point A', and the estimated time of arrival may refer to a time point at which the means of transportation is expected to arrive at 'Point C' after departing from 'Point B'.

Referring to FIG. 2B, the second user terminal 1002 may receive, from a second user, an input of a departure point and a destination. For example, the second user may input 'Point C' as the departure point and 'Point D' as the destination, through an input interface of the second user terminal 1002.

The second user terminal 1002 may transmit second itinerary information including the departure point and the destination, to the travel route generation server 2000. Hereinafter, it is assumed that the travel route generation server 2000 receives the second itinerary information from the second user terminal 1002 after generating a travel route based on first itinerary information received from the first user terminal 1001.

The travel route generation server 2000 may update the travel route based on the second itinerary information received from the second user terminal 1002.

For example, after receiving the second itinerary information from the travel route generation server 2000, the travel route may be updated by additionally generating a travel route for moving from 'Point B' to 'Point C', which is the departure point of the second user, and a travel route for moving from 'Point C' to 'Point D', which is the destination of the second user, in addition to the existing travel route.

Although FIG. 2B illustrates that the travel route from 'Point C' to 'Point D' and the travel route from 'Point D' to 'Point E' are straight lines, this is for convenience of description, and the travel routes between the respective points may be generated to include travelable sections on an actual map.

The travel route generation server 2000 may calculate an estimated time of departure and an estimated time of arrival based on the generated travel routes. The estimated time of departure may refer to a time point at which the means of transportation is expected to arrive at 'Point C' after departing from 'Point B', and the estimated time of arrival may refer to a time point at which the means of transportation is expected to arrive at 'Point D' after departing from 'Point C'.

Although FIG. 2B illustrates that the travel route is generated such that the means of transportation moves in the order of 'Point A', 'Point B', 'Point C', 'Point D', and 'Point E', this is only an example, and the present disclosure is not limited thereto. For example, the travel route generation server 2000 may generate the travel route by using nearest insertion (NI), cheapest insertion (CI), farthest insertion (FI), random insertion (RI), evolutionary algorithm, and the like to determine an order of visits to the points.

Each of the terms 'first group points' and 'second group points' used below may include one or more points. The 'first group points' and the 'second group points' may be distinguished from each other based on a particular time point. Points obtained by the travel route generation server 2000 before the particular time point may be referred to as 'first group points', and points obtained after the particular time point may be referred to as 'second group points'. The particular time point may be a time point after an estimated required time related to the 'first group points' is recorded in a weight matrix, and before an estimated required time related to the 'second group points' is recorded in the weight matrix.

Figure 3:
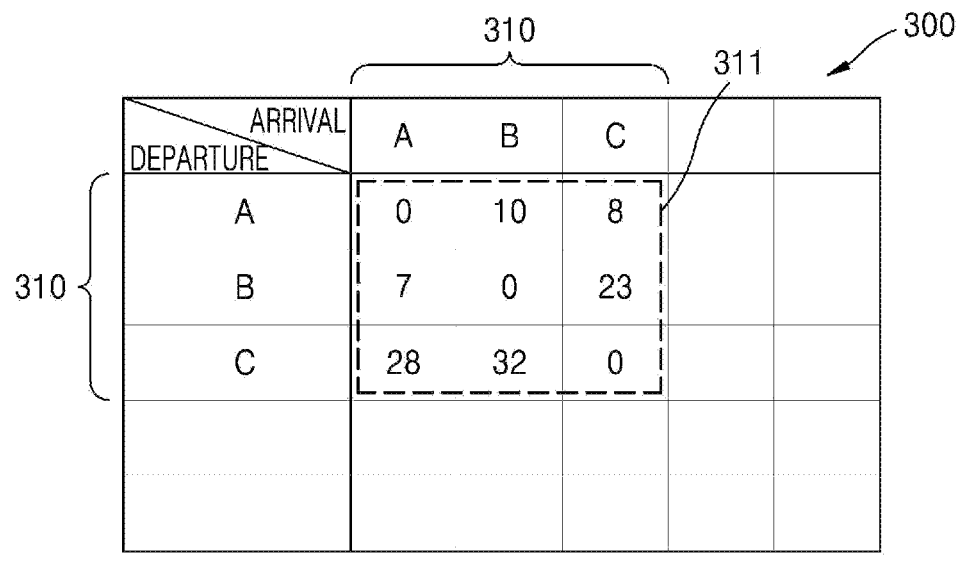

FIG. 3 is a diagram for describing an example in which first estimated required times are recorded in a weight matrix, according to an embodiment.

The travel route generation server 2000 may obtain first information related to first group points 310. The first information may include the latitude and longitude of each first group point, a traffic condition around the first group point, etc., but is not limited thereto. The first information may be information received from the user terminal 1000. The first information may be included in the first itinerary information described above with reference to FIG. 2A, the first itinerary information may be included in the first information, or the first information and the first itinerary information may include part of the same information.

The travel route generation server 2000 may calculate first estimated required times for moving between the first group points 310, based on the first information. For example, the estimated required time for moving from 'Point A' to 'Point B' may be 7 minutes, and the estimated required time for moving from 'Point A' to 'Point C' may be 28 minutes. Meanwhile, when the departure point and the destination are switched, the estimated required time may vary due to factors such as traffic conditions. The estimated required time for moving from 'Point A' to 'Point B' may be 7 minutes whereas the estimated required time for moving from 'Point B' to 'Point A' may be 10 minutes.

The travel route generation server 2000 may record the first estimated required times in a first area 311 of a weight matrix 300. The travel route generation server 2000 may generate a travel route based on the first estimated required times recorded in the first area 311 of the weight matrix 300. In detail, the travel route generation server 2000 may generate the travel route by using NI, CI, FI, RI, evolutionary algorithm, and the like to determine an order of visits to the points. That is, the travel route generation server 2000 may generate the travel route indicating an order of visits to 'Point A', 'Point B', and 'Point C'.

FIG. 4 is a diagram for describing an example in which second estimated required times are recorded in a weight matrix, according to an embodiment.

The travel route generation server 2000 may obtain second information related to a second group point 410. The second information may include the latitude and longitude of each second group point, a traffic condition around the second group point, etc., but is not limited thereto. The second information may be information received from the user terminal 1000. The second information may be included in the second itinerary information described above with reference to FIG. 2B, the second itinerary information may be included in the second information, or the second information and the second itinerary information may include part of the same information.

Hereinafter, it is assumed that the second information related to the second group point 410 is obtained after the first estimated required times are recorded in the first area 311 of the weight matrix 300.

Based on the first information and the second information, the travel route generation server 2000 may calculate second estimated required times including estimated required times for moving from the first group points 310 to the second group point 410, and estimated required times for moving from the second group point 410 to the first group points 310.

The travel route generation server 2000 may record the second estimated required times in a second area 411 of the weight matrix 300.

In an embodiment, the travel route generation server 2000 may use a multi-point-to-point (M2P) route finding method to calculate the estimated required times for moving from the first group points 310 to the second group point 410 and record the estimated required times in the second area 411. In addition, the travel route generation server 2000 may use a point-to-multi-point (P2M) route finding method to calculate the estimated required times for moving from the second group point 410 to the first group points 310 and record the estimated required times in the second area 411. Here, the travel route generation server 2000 may maintain the first estimated required times recorded in the first area 311 without updating them, by using a certain method. The certain method may be a dynamic programming (DP) method. Hereinafter, it is assumed that the certain method is the DP method, but the certain method is not limited thereto.

The travel route generation server 2000 may generate a travel route based on the first estimated required times recorded in the first area 311 of the weight matrix 300 and the second estimated required times recorded in the second area 411 of the weight matrix 300. That is, the travel route generation server 2000 may generate the travel route indicating an order of visits to 'Point A', 'Point B', 'Point C', and 'Point D'.

In the present disclosure, in a case in which the second estimated required times are calculated after the first estimated required times are recorded in the first area 311 of the weight matrix 300, the first estimated required times recorded in the first area 311 of the weight matrix 300 are maintained without being updated, by using a certain method, and the second estimated required times are recorded in the second area 411 of the weight matrix 300 by using an M2P route finding method and a P2M route finding method, such that the computing power and the required time for recording data in the weight matrix 300 may be reduced.

FIG. 5 is a diagram for describing an example in which second estimated required times are recorded in a weight matrix, according to an embodiment.

Compared with FIGS. 3 and 4, FIG. 5 illustrates that pairs of points are provided to the travel route generation server 2000. For example, a customer using a demand-responsive transport service inputs both a departure point and a destination, and thus, information, received by the travel route generation server 2000 from the user terminal 1000 may include information related to two points.

Referring to FIG. 5, $A_s$ and $A_d$ may be a departure point and a destination for User A, $B_s$ and $B_d$ may be a departure point and a destination for User B, and $C_s$ and $C_d$ may be a departure point and a destination for User C, respectively.

The travel route generation server 2000 may obtain first information related to first group points 510. The travel route generation server 2000 may calculate first estimated required times for moving between the first group points 510, based on the first information. The travel route generation server 2000 may record the first estimated required times in a first area 511 of the weight matrix 300.

After the first estimated required times are recorded in the first area 511 of the weight matrix 300, the travel route generation server 2000 may obtain second information related to second group points 520. Based on the first information and the second information, the travel route generation server 2000 may calculate second estimated required times including estimated required times for moving from the first group points 510 to the second group points 520, and estimated required times for moving from the second group points 520 to the first group points 510.

The travel route generation server 2000 may record the second estimated required times in a second area 521 of the weight matrix 300.

In an embodiment, the travel route generation server 2000 may use an M2P route finding method and a P2M route finding method to record the second estimated required times in the second area 521.

FIG. 6 is a diagram for describing an example of updating a weight matrix, according to an embodiment.

Referring to FIG. 6, first estimated required times for moving between first group points 610 are recorded in the weight matrix 300.

The travel route generation server 2000 may obtain second information related to a second group point 620, after the first estimated required times are recorded in the weight matrix 300.

When obtaining the second information, the travel route generation server 2000 may determine whether the first estimated required times recorded in the weight matrix 300 are invalidated. In an embodiment, the travel route generation server 2000 may obtain a time-to-live (TTL) value for each of the first estimated required times. Based on the TTL value of a certain first estimated required time being greater than or equal to a threshold value, the travel route generation server 2000 may determine that the first estimated required time is invalid. The threshold value may be 3 minutes, 4 minutes, 5 minutes, 6 minutes, 7 minutes, etc., but is not limited thereto.

The travel route generation server 2000 may update the first estimated required time determined as having been invalid. Referring to FIG. 6, the travel route generation server 2000 may determine that the TTL value of the estimated required time for moving from 'Point A' to 'Point C' among the first estimated required times recorded in the weight matrix 300 is greater than or equal to the threshold value (e.g., 5 minutes), and then update the estimated required time for moving from 'Point A' to 'Point C'. That is, the estimated required time for moving from 'Point A' to 'Point C' may be updated from 8 minutes to 9 minutes, and the estimated required time for moving from 'Point C' to 'Point A' may be updated from 28 minutes to 17 minutes.

The travel route generation server 2000 may generate a travel route based on the updated first estimated required times.

FIG. 7 is a diagram for describing an example of updating a weight matrix, according to an embodiment.

Referring to FIG. 7, first estimated required times for moving between first group points 710 are recorded in the weight matrix 300.

The travel route generation server 2000 may determine a travel completion point 711 at which travel is completed, among the first group points 710. In an embodiment, the travel route generation server 2000 may obtain location information of the means of transportation from the outside, and determine the travel completion point 711 based on the location information of the means of transportation. Referring to FIG. 7, the travel route generation server 2000 may determine 'Point A' as the travel completion point 711.

The travel route generation server 2000 may delete the first estimated required times related to the travel completion point 711 from the weight matrix 300.

After 'Point A' is determined as the travel completion point 711, the travel route generation server 2000 may delete the first estimated required times, the departure points and destinations of which are 'Point A'.

The travel route generation server 2000 may delete the estimated required times related to the travel completion point 711 from the weight matrix 300, and then stop updating the estimated required times related to the travel completion point 711.

Figure 8:
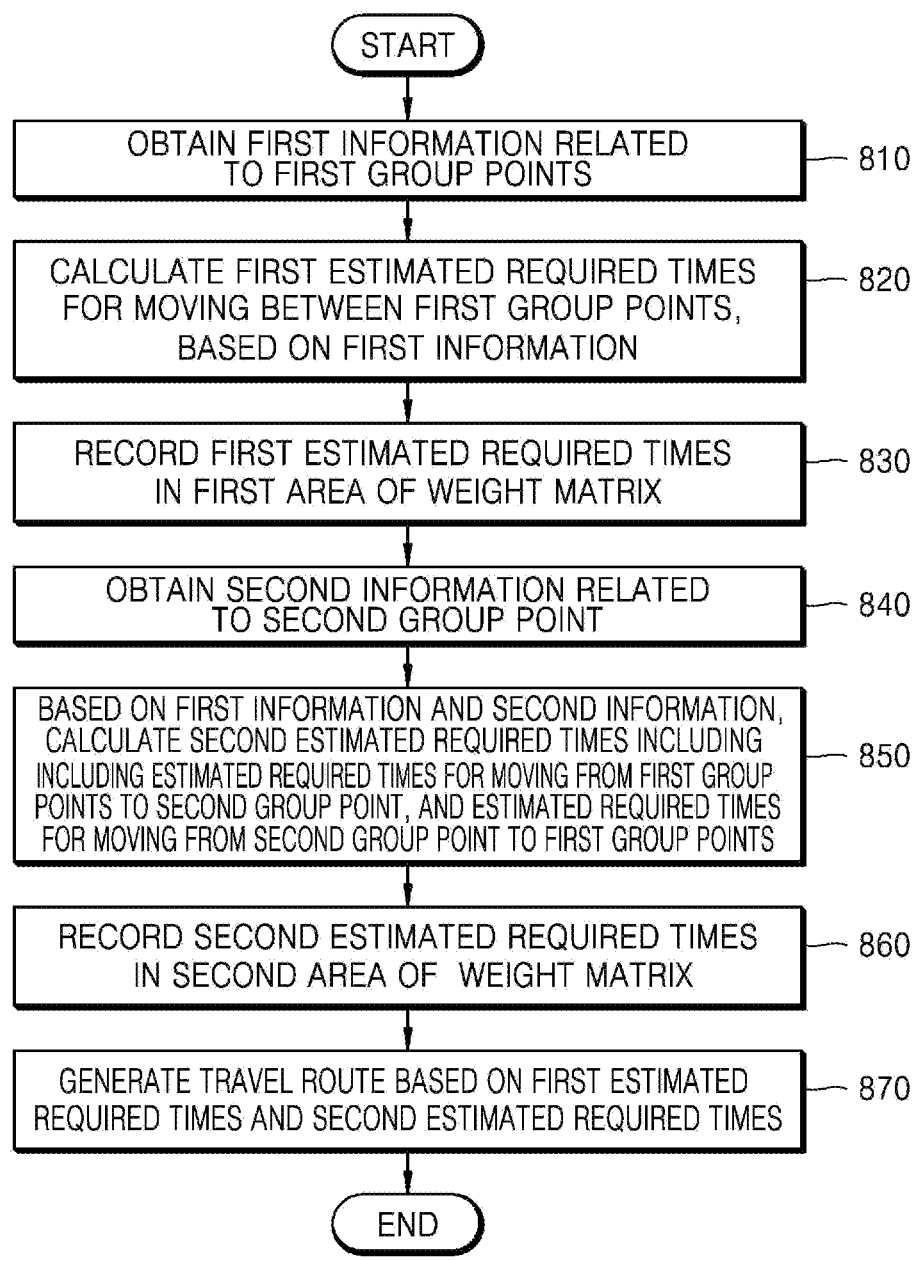
FIG. 8 is a flowchart of a method of generating a travel route, according to an embodiment.

FIG. 8 is a flowchart of a method of generating a travel route, according to an embodiment.

The method of generating a travel route illustrated in FIG. 8 is related to the embodiments described above with reference to the drawings, and thus, the descriptions provided above but omitted below may be applied to the method illustrated in FIG. 8.

Referring to FIG. 8, in operation 810, a processor may obtain first information related to first group points.

The first information may include the latitude and longitude of each first group point, a traffic condition around the first group point, etc., but is not limited thereto.

In operation 820, the processor may calculate first estimated required times for moving between the first group points, based on the first information.

The processor may calculate the first estimated required times based on the latitude and longitude of each first group point, a traffic condition around the first group point, and the like.

In operation 830, the processor may record the first estimated required times in a first area of a weight matrix.

In operation 840, the processor may obtain second information related to a second group point.

The second information may include the latitude and longitude of each second group point, a traffic condition around the second group point, etc., but is not limited thereto.

In operation 850, the processor may calculate, based on the first information and the second information, second estimated required times including estimated required times for moving from the first group points to the second group point, and estimated required times for moving from the second group point to the first group points.

The processor may calculate the second estimated required times based on the latitude and longitude of each first group point, a traffic condition around the first group point, the latitude and longitude of the second group point, a traffic condition around the second group point, and the like.

In operation 860, the processor may record the second estimated required times in a second area of the weight matrix.

In an embodiment, the processor may use an M2P route finding method to calculate the estimated required times for moving from the first group points to the second group point, and record the estimated required times in the second area.

In addition, the processor may use a P2M route finding method to calculate the estimated required times for moving from the second group point to the first group points, and record the estimated required times in the second area. Here, the processor may maintain the first estimated required times recorded in the first area without updating them, by using a certain method. The certain method may be a DP method but is not limited thereto.

In operation 870, the processor may generate a travel route based on the first estimated required times and the second estimated required times.

The processor may generate the travel route based on the first estimated required times recorded in the first area of the weight matrix and the second estimated required times recorded in the second area of the weight matrix. In detail, the processor may generate the travel route by using NI, CI, FI, RI, evolutionary algorithm, and the like to determine an order of visits to the points.

Figure 9:
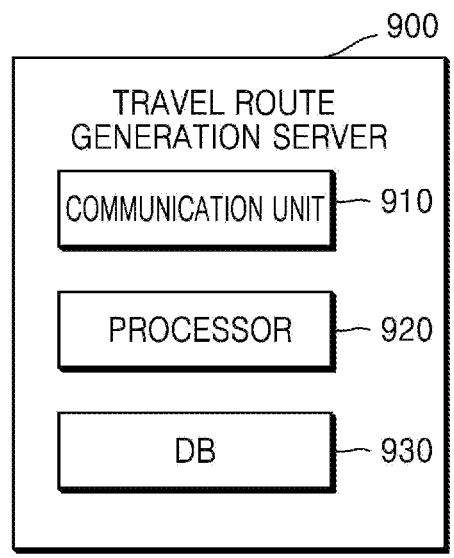
FIG. 9 is a block diagram of a travel route generation server according to an embodiment.

FIG. 9 is a block diagram of a travel route generation server according to an embodiment.

Referring to FIG. 9, a travel route generation server 900 may include a communication unit 910, a processor 920, and a database (DB) 930. FIG. 9 illustrates the travel route generation server 900 including only the components related to an embodiment. Therefore, it would be understood by those of skill in the art that other general-purpose components may be further included in addition to those illustrated in FIG. 9.

The communication unit 910 may include one or more components that enable wired/wireless communication between user terminals and external servers. For example, the communication unit 910 may include at least one of a short-range communication unit (not shown), a mobile communication unit (not shown), and a broadcast receiver (not shown).

The DB 930 is hardware for storing various data processed by the travel route generation server 900, and may store a program for the processor 920 to perform processing and control. The DB 930 may store driving-related information, user information, and the like.

The DB 930 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 920 controls the overall operation of the travel route generation server 900. For example, the processor 920 may execute programs stored in the DB 930 to control the overall operation of an input unit (not shown), a display (not shown), the communication unit 910, the DB 930, and the like. The processor 920 may execute programs stored in the DB 930 to control the operation of the travel route generation server 900.

The processor 920 may control at least some of the operations of the travel route generation server 900 described above with reference to FIGS. 1 to 8.

The processor 920 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

Embodiments of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skilled in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

The invention claimed is:

1. A method for generating a travel route, the method comprising:
   obtaining first information related to first group points;
   calculating first estimated required times for moving between the first group points, based on the first information;
   recording the first estimated required times in a first area of a matrix;
   obtaining second information related to a-second group points;
   calculating, based on the first information and the second information, second estimated required times comprising estimated required times for moving from the first group points to the second group points, and estimated required times for moving from the second group points to the first group points;
   recording the second estimated required times in a second area of the matrix; and generating a travel route based on the first estimated required times and the second estimated required times, wherein the first group points and the second group points are distinguished from each other based on a particular time point, and the particular time point is a time point after a time point after the first estimated required times are recorded in the matrix, and before the second estimated required times are recorded in the matrix, and the travel route is generated based on the first estimated required times and the second estimated required times such that at least one point included in the first group points and at least one point included in the second group points each serve as at least one of a starting point and an ending point.

2. The method of claim 1, wherein a multi-point-to-point (M2P) route finding method is used to calculate the estimated required times for moving from the first group points to the second group points, and record the estimated required times in the second area, and a point-to-multi-point (P2M) route finding method is used to calculate the estimated required times for moving from the second group points to the first group points, and record the estimated required times in the second area.

3. The method of claim 1, further comprising:

when obtaining the second information, determining whether the first estimated required times are invalidated; and in the matrix, updating the first estimated required times which are invalidated.

4. The method of claim 1, further comprising:

determining a travel completion point at which travel is completed, from among the first group points; and deleting the estimated required times related to the travel completion point from the weight matrix.

5. An apparatus for generating a travel route, the apparatus comprising:

a memory storing at least one program; and a processor configured to executing the at least one program to perform an operation, wherein the processor is further configured to:

obtain first information related to first group points;

calculate first estimated required times for moving between the first group points, based on the first information;

record the first estimated required times in a first area of a weight matrix;

obtain second information related to a second group points;

calculate, based on the first information and the second information, second estimated required times comprising estimated required times for moving from the first group points to the second group points, and estimated required times for moving from the second group points to the first group points;

record the second estimated required times in a second area of the matrix; and generate a travel route based on the first estimated required times and the second estimated required times, wherein the first group points and the second group points are distinguished from each other based on a particular time point, and the particular time point is a time point after a time point after the first estimated required times are recorded in the matrix, and before the second estimated required times are recorded in the matrix, and the travel route is generated based on the first estimated required times and the second estimated required time such that at least one point included in the first group points and at least one point included in the second group points each serve as at least one of a starting point and an ending point.

6. The apparatus of claim 5, wherein a multi-point-to-point (M2P) route finding method is used to calculate the estimated required times for moving from the first group points to the second group points, and record the estimated required times in the second area, and a point-to-multi-point (P2M) route finding method is used to calculate the estimated required times for moving from the second group points to the first group points, and record the estimated required times in the second area.

7. The apparatus of claim 5, wherein the processor is further configured to:

when obtaining the second information, determine whether the first estimated required times are invalidated; and in the matrix, update the first estimated required times which are invalidated.

8. The apparatus of claim 5, wherein the processor is further configured to:

determine a travel completion point at which travel is completed, from among the first group points; and delete the estimated required times related to the travel completion point from the weight matrix.

9. A non-transitory computer-readable recording medium having recorded thereon a program for causing a computer to execute the method of claim 1.

* * * * *